United States Patent [19]

Bar-David

[11] Patent Number: 5,237,287
[45] Date of Patent: Aug. 17, 1993

[54] DEMODULATING METHOD AND APPARATUS PARTICULARLY FOR DEMODULATING A DIFFERENTIAL PHASE-SHIFT KEYING SIGNAL

[75] Inventor: Israel Bar-David, Haifa, Israel

[73] Assignee: Technion Research and Development Foundation Ltd., Haifa, Israel

[21] Appl. No.: 903,397

[22] Filed: Jun. 24, 1992

[30] Foreign Application Priority Data

Jul. 4, 1991 [IL] Israel .................................. 98730

[51] Int. Cl.[5] .............................................. H03D 3/00
[52] U.S. Cl. ...................................... 329/308; 375/84; 375/81
[58] Field of Search ............................ 329/304–310; 375/52, 56, 83–85, 80, 81

[56] References Cited

U.S. PATENT DOCUMENTS

| | | | |
|---|---|---|---|
| 3,818,346 | 6/1974 | Fletcher et al. | 375/85 |
| 4,057,759 | 11/1977 | Genova et al. | 375/85 |
| 4,715,047 | 12/1987 | Hambley | 329/310 X |
| 4,942,591 | 7/1990 | Nease et al. | 329/304 X |

*Primary Examiner*—David Mis
*Attorney, Agent, or Firm*—Benjamin J. Barish

[57] ABSTRACT

A method and apparatus are described for demodulating a modulated signal having a carrier component and a data component, in which the modulated signal is split into at least two parts one of which is delayed with respect to the other, and the two parts are multiply-coupled and linearly-combined to produce a combined output corresponding to a function of the data component independent of the carrier component frequency. In the described method and apparatus the undelayed part is coupled with the delayed part in a multiport coupler, wherein the parts are relatively phase-shifted to produce a plurality of phase-shifted signals; and the phase-shifted signals are linearly combined such that the data component, in the function of the combined output, is not affected by variations in frequency or phase of the carrier component. This enables a robust direct-detection DPSK receiver.

20 Claims, 8 Drawing Sheets

DEMODULATING METHOD AND APPARATUS PARTICULARLY FOR DEMODULATING A DIFFERENTIAL PHASE-SHIFT KEYING SIGNAL

FIELD AND BACKGROUND OF THE INVENTION

The present invention relates to a method and apparatus for demodulating an electrical signal. The method and apparatus of the present invention are particularly useful for demodulating a differential phase-shift keying signal, and are therefore described below particularly with respect to this application.

In traditional phase modulation, a data signal $\phi(t)$ is impressed on a carrier signal of frequency $f_c$ to produce a modulated signal of amplitude A $$A \cos(2\pi f_c t + \phi(t))$$

where the phase angle $\phi(t)$ is either 0 or $\pi$ and may change only at integral multiples of the symbol (or bit period) duration $\tau$. In a conventional method of differential demodulation, a delayed version of the received signal is used for phase reference to the incoming signal, whereupon a multiplier is often used to generate the product:

$$A^2 \cos(2\pi f_c t + \phi(t))\cos(2\pi f_c(t-\tau) + \phi(t-\tau))$$

After lowpass filtering this includes only the phase-difference term:

$$\tfrac{1}{2}A^2 \cos(2\pi f_c \tau + \phi(t) - \phi(t-\tau))$$

It would be convenient if the term product $f_c \tau$ would be an integer because then $$\cos(2\pi f \tau + \phi(t) - \phi(t-\tau)) = \cos(\phi(t) - \phi(t-\tau)) = \cos\Delta\phi$$

and since the phase difference, which we denote by $\Delta\phi = \phi(t) - \phi(t-\tau)$, is either 0 or $\pi$, depending on the modulating data, the cosine of it is respectively, 1 or $-1$, yielding exact demodulation. If, however, the term product $f_c \tau$ is not an integer because of uncertainties of frequency, and if the quantity denoted by $\alpha$ is equal to $2\pi f_c \tau$, modulo $2\pi$, then the following phase shifted angle obtains:

$$\cos(\phi(t) - \phi(t-\tau) + \alpha) = \cos\Delta\phi\cos\alpha - \sin\Delta\phi\sin\alpha$$

Since $\sin\Delta\phi = 0$ for both signal data alternatives, the result reduces to $\cos\Delta\phi\cos\alpha$; and if $\alpha$ is arbitrary, $\cos\alpha$ can take on arbitrary values between $-1$ and $+1$, including zero, in which case the output is useless.

The inevitable conclusion is that under frequency uncertainties, where the term product $f_c \tau$ can shift from a pre-designed integer value by a fraction $(\delta f)\tau$ such that $2\pi(\delta f)\tau$ becomes comparable to 1 radian, the conventional detection method is not satisfactory.

Such frequency uncertainty is present in various radio frequency applications because of, for example, unknown Doppler shifts, as well as in optical communication systems that use semiconductor lasers of relatively unstable frequency. It should be noted that $\alpha$ is in effect a time-varying quantity but its variations, mostly because of the thermal effects in the oscillators and in varying Doppler shifts, are relatively slow, as compared to the data rate in $\phi(t)$.

OBJECTS AND SUMMARY OF THE INVENTION

An object of the present invention is to provide a method, and also apparatus, for demodulating a signal, and particularly a binary differential phase-shift keyed (DPSK) signal, of uncertain carrier frequency or phase.

According to the present invention, there is provided a method of demodulating a modulated signal having a carrier component and a data component, characterized in that the modulated signal is split into at least two parts one of which is delayed with respect to the other, and the two parts are coupled and linearly-combined to produce a combined output corresponding to a function of the data component independent of the carrier component. The the undelayed part is coupled with the delayed part in a multiport coupler, wherein the parts are relatively phase-shifted to produce a plurality of phase-shifted signals; and the phase-shifted signals are linearly combined such that the data component, in the function of the combined output, is not affected by variations in frequency or phase of the carrier component.

It is thus seen that the invention uses a plurality of phases in a multiphase differential detection to overcome the frequency uncertainty problem.

A demodulator operating in accordance with the foregoing method is insensitive to frequency and phase variations in the carrier signal because, when the frequency or phase changes, it alters the plurality of phase-shifted signals in a way such that their linearly combined outputs remain constant independently of frequency or phase. Prior art demodulators, using only a single phase output, are subject to variations which can even lead to complete destruction of the output variable.

According to further features in the described preferred embodiments, the parts are coupled in a 2-port 90°-hybrid to produce two relatively 90°-shifted signals, which signals are linearly combined to produce the combined output. Alternatively, the parts are coupled in a symmetrical 3-port coupler to produce an unshifted signal, a 120°-shifted signal and a 240°-shifted signal, which signals are linearly combined to produce the combined output. Generally, the two-phase version is preferred for radio frequency applications, whereas the three-phase versions are preferred for lightwave applications.

The invention is described below, for purposes of example, as included in a homodyne type demodulator and in a heterodyne type demodulator.

In the type of demodulator which does not use a local oscillator, hereinafter referred to as the direct-detection type demodulator, the delayed and undelayed parts resulting from the splitting of the initial modulated signal are fed to a 2-port 90°-hybrid coupler, producing two relatively 90°-shifted output signals; or alternatively, to a 3-port symmetrical coupler producing an unshifted output signal, a 120°-shifted output signal, and a 240°-shifted output signal. The combined output of the demodulator, corresponding to a function of the data component independent of the carrier component frequency, is produced by linearly combining the three output signals from the multiport coupler in a base-band phase equalizer (BBPE) to be described below.

In the heterodyne type demodulator described herein, the original modulated signal is fed with a local oscillator signal to a 90°-hybrid coupler producing two relatively 90°-shifted output signals; or alternatively, to a 3-port symmetrical coupler producing an unshifted output signal, a 120°-shifted output signal, and a 240°-shifted output signal. The input to the BBPE is produced by mixing and lowpass filtering the two output signals from the 90°-hybrid; or alternatively the three output signals from the 3-port coupler with the delayed replica of one of them. The combined output of the demodulator, corresponding to a function of the data component independent of the carrier component frequency, is the output of the BBPE.

According to a further feature in the preferred embodiments of the invention described below, the original modulated signal is a differential phase-shift keying signal wherein the data component changes the phase of the carrier component when and only when the data component is a data symbol representing logical "1".

According to further features in the described preferred embodiments, the signals are linearly combined in a base-band phase-equalizer to produce the combined output. More particularly, the base-band phase-equalizer includes a feedback circuit which upon receiving a 2- or 3-vector: ($A_o \cos \alpha$, $A_o \sin \alpha$) or ($A_o \cos \alpha$, $A_o \cos (\alpha+120°)$, $A_o \cos (\alpha+240°)$), respectively, estimates a quantity x close to $\alpha$; generates a 2- or 3-vector (cos x, sin x) or (cos x, cos (x+120°), cos (x+240°)), respectively, and then performs their inner product, generating terms proportional to $A_o \cos(\alpha-x)$ and to $A_o \sin(\alpha-x)$, the first term being proportional to the desired quantity, $A_o$, while the second term is close to the error term $A_o \delta = A_o (\alpha-x)$ used in the feedback configuration to generate the quantity x. The quantity $\delta$ denotes the error term $(\alpha-x)$.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
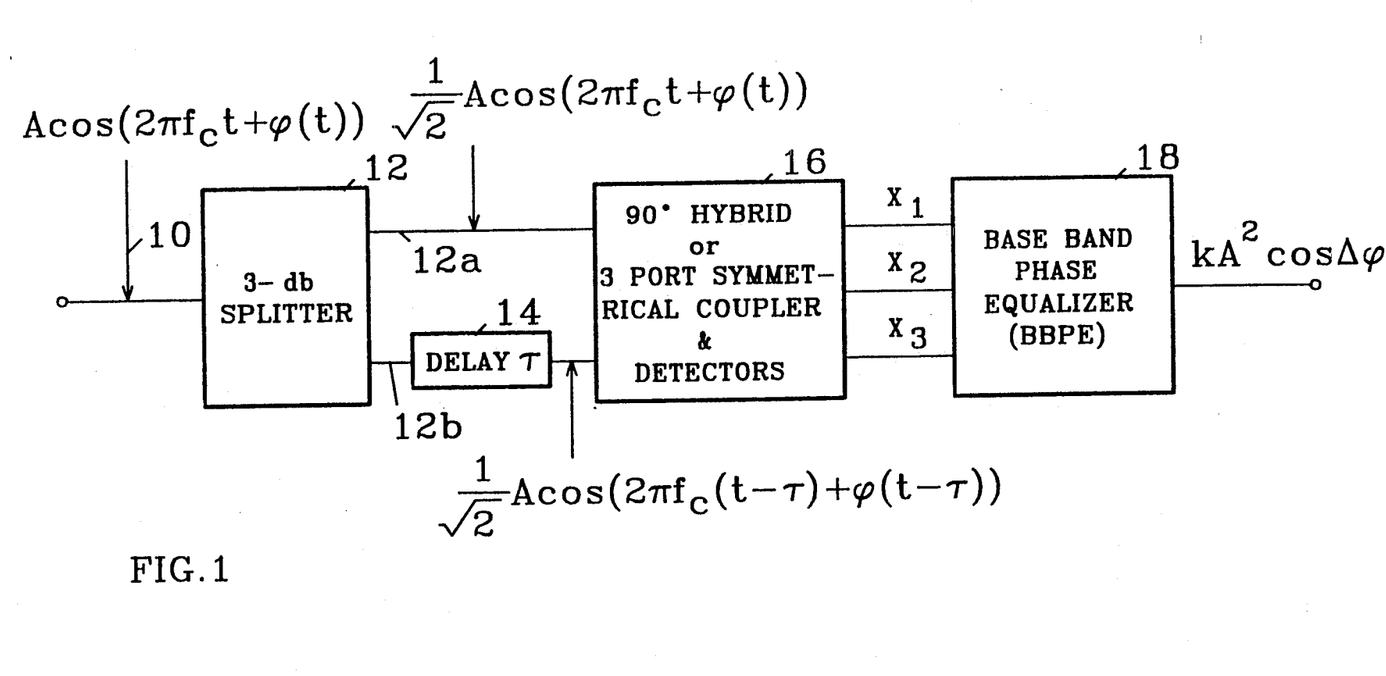
FIG. 1 illustrates a direct-detection type demodulator constructed in accordance with the present invention.

The Demodulator of FIG. 1

FIG. 1 illustrates a direct-detection type demodulator constructed in accordance with the present invention.

The modulated signal to be demodulated is a DPSK (differential phase-shifted keying) signal, in which the data component changes the phase of the carrier component ($f_c$) only when the data component is a data symbol representing a logical "1".

As shown in FIG. 1, the signal 10 to be demodulated, of amplitude A, is fed to a splitter 12 which outputs two parts on its two output lines 12a, 12b. The part outputted via line 12b is delayed in a delay circuit 14 by one symbol duration. It is then inputted, with the undelayed part on output line 12a, to a multiport coupler 16, which may be a 2-port 90°-hybrid coupler or a 3-port symmetrical coupler the latter circuit also including the appropriate detectors and filters. The filtered output signals $x_1$, $x_2$, $x_3$ are linearly combined in a base-band phase-equalizer (BBPE) 18 described below, to yield the desired DPSK output proportional to $A^2 \cos \Delta\phi$, where $\Delta\phi$ denotes the phase difference $\phi(t)-\phi(t-\tau)$; and $\alpha$ denotes the phase $2\pi f_c \tau$, modulo $2\pi$; and k is a proportionality constant.

It will be seen that if the multiphase coupler 16 is a 2-port 90°-hybrid, the output signals will be as follows:

$$x_1 = LA^2 \cos \Delta\phi \cos \alpha$$

$$x_2 = LA^2 \cos \Delta\phi \sin \alpha$$

$$x_3 = 0$$

where L is a proportionality constant depending on the components.

On the other hand, if coupler 16 is a 3-port symmetrical coupler, its output signals will be:

$$x_1 = LA^2 \cos \Delta\phi \cos \alpha$$

$$x_2 = LA^2 \cos \Delta\phi \cos (\alpha+120°)$$

$$x_3 = LA^2 \cos \Delta\phi \cos (\alpha+240°)$$

In either case, the combined output of the BBPE 18 will be insensitive to frequency or phase variations in the carrier because an frequency or phase changes will alter the multiphase outputs of coupler 16 such that their linearly combined outputs will remain constant, and therefore independent of frequency or phase.

Figure 2:
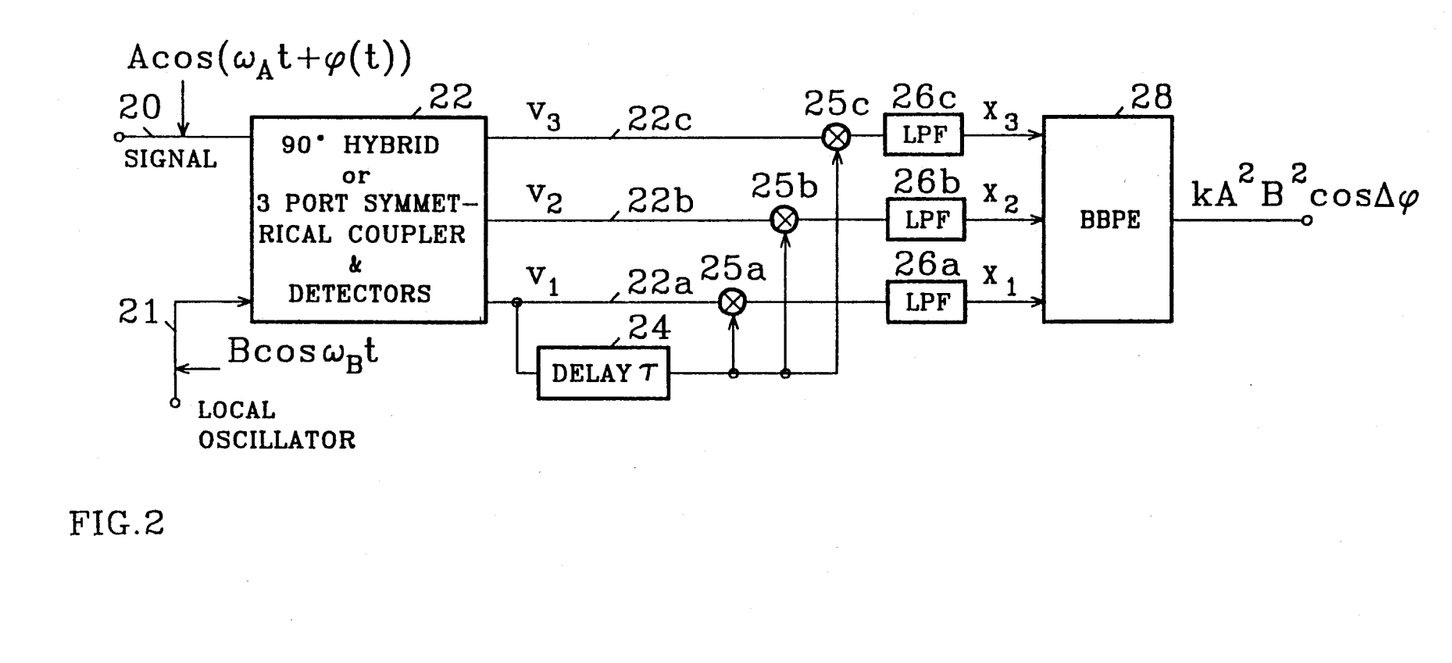
FIG. 2 illustrates a heterodyne type demodulator constructed in accordance with the present invention.

The Demodulator of FIG. 2

FIG. 2 illustrates a heterodyne type demodulator constructed in accordance with the present invention.

In the heterodyne type demodulator illustrated in FIG. 2, the original signal 20 to be demodulated, and of an amplitude of "A", is inputted with a signal 21 from a local oscillator, and of an amplitude "B", into the multiport coupler circuit 22 which, as described above with respect to FIG. 1, may be a 2-port 90°-hybrid or a 3-port symmetrical coupler. Coupler 22 produces three outputs $v_1$, $v_2$, $v_3$ on its output lines 22a, 22b and 22c, respectively, at an intermediate frequency $\omega_I = \omega_B - \omega_A$. Only one of the outputs, namely $v_1$ on output line 22a, is delayed by a delay circuit 24, and is used to multiply each of the undelayed outputs, as shown by multipliers 25a-25c, respectively. The outputs are then filtered, by filters 26a-26c, respectively, to produce the output signals $x_1$-$x_3$, respectively. These output signals are linearly combined in the BBPE circuit 28 to produce the desired DPSK combined output corresponding to a function of the data component independent of the carrier component frequency.

Where the multiphase coupler 22 is a 2-port 90°-hybrid, it will be seen that the coupler output signals $v_1$ to $v_3$ will be:

$$v_1 = L_1 AB \cos(w_I t + \phi(t))$$

$$v_2 = L_1 AB \sin(w_I t + \phi(t))$$

$$v_3 = 0$$

where $L_1$ is a proportionality constant, and the signals $x_1$-$x_3$ combined in the BBPE 28 will be:

$$x_1 = L_2 A^2 B^2 \cos\Delta\phi \cos\alpha$$

$$x_2 = L_2 A^2 B^2 \cos\Delta\phi \sin\alpha$$

$$x_3 = 0$$

where $L_2$ is another proportionality constant. On the other hand, if the multiport coupler 22 is a 3-port symmetrical coupler, then the signals $v_1$-$v_3$ on its outputs lines 22a-22c will be:

$$v_1 = L_3 AB \cos(w_I t + \phi(t))$$

$$v_2 = L_3 AB \cos(w_I t + \phi(t) + 120°)$$

$$v_3 = L_3 AB \cos(w_I t + \phi(t) + 240°)$$

where $L_3$ is another proportionality constant, and the signals $x_1$, $x_2$, $x_3$ combined in the BBPE 28 will be:

$$x_1 = L_4 A^2 B^2 \cos\Delta\phi \cos\alpha$$

$$x_2 = L_4 A^2 B^2 \cos\Delta\phi \cos(\alpha + 120)$$

$$x_3 = L_4 A^2 B^2 \cos\Delta\phi \cos(\alpha + 240)$$

where $L_4$ is still another proportionality constant.

In either case, as described above with respect to FIG. 1, variations in the frequency or phase of the carrier will not affect the combined output because such variations will alter the inputs to the BBPE 28 a manner such that their proper linear combination will be insensitive to carrier frequency.

Figure 3:
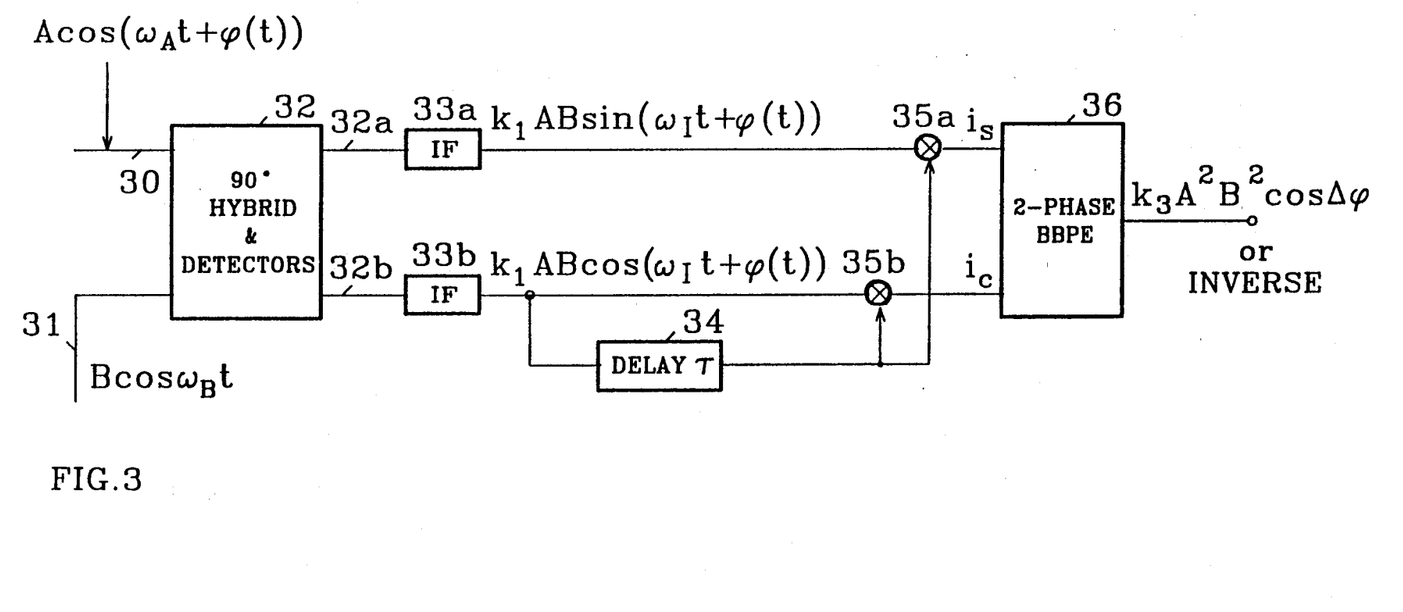
FIG. 3 illustrates a two-phase heterodyne type demodulator constructed in accordance with the present invention.

The Demodulator of FIG. 3

FIG. 3 illustrates a two-phase heterodyne embodiment particularly suitable for radio frequency applications.

In FIG. 3 the signal 30, $a \cos(\omega_A t + \phi(t))$, is combined with the local oscillator output 31, $B \cos \omega_B t$, in a complex mixer 32 composed of a 90°-hybrid and appropriate detectors. The two quadrature outputs $$k_1 AB \sin(W_I T + \phi(t))$$

$$k_1 AB \cos(W_I t + \phi(t))$$

on output lines 32a, 32b are filtered at Intermediate Frequency $\omega_I = \omega_B - \omega_A$ by filters 33a, 33b. The cosine term is delayed at 34, split, and multiplied at 35a, 35b into both undelayed quadrature signals yielding, after lowpass filtering, the two quadrature lowpass terms $$i_C = k_2 A^2 B^2 \cos\alpha \cos\Delta\phi$$

$$i_S = k_2 A^2 B^2 \sin\alpha \cos\Delta\phi$$

which are input to the two-phase BBPE 36.

Figure 5:
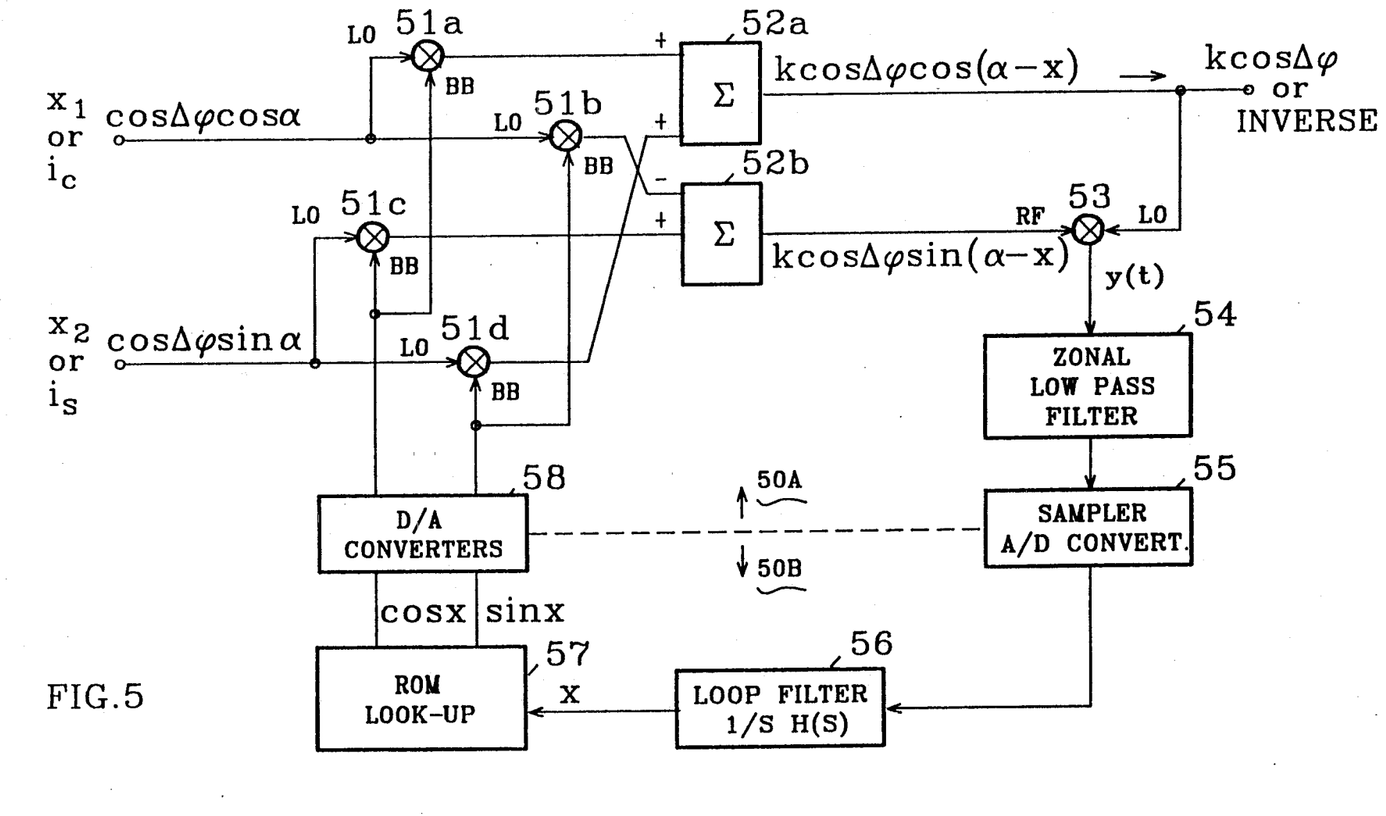
FIG. 5 illustrates a two-phase base-band phase-equalizer (BBPE) particularly useful in the method and apparatus of the present invention.

The operation of BBPE 36 is described in FIG. 5. It effectively multiplies $i_C$ and $i_S$ by either $\cos\alpha$ and $\sin\alpha$, respectively, and sums them, yielding the desired output proportional to $A^2 B^2 \cos\Delta\phi$, or by $\cos(\alpha + \pi)$ and $\sin(\alpha + \pi)$ yielding $-A^2 B^2 \cos\Delta\phi$, which is the inverse of the desired output. This ambiguity, in the sign of the entire sequence of the desired output data symbols, is readily resolved by differential encoding, which is a routine procedure in DPSK art. Here $k_1$ and $k_3$ in FIG. 3 are proportionality constants that depend on the parameters of the hardware components used in the receiver design but are independent of A and B.

Figure 4:
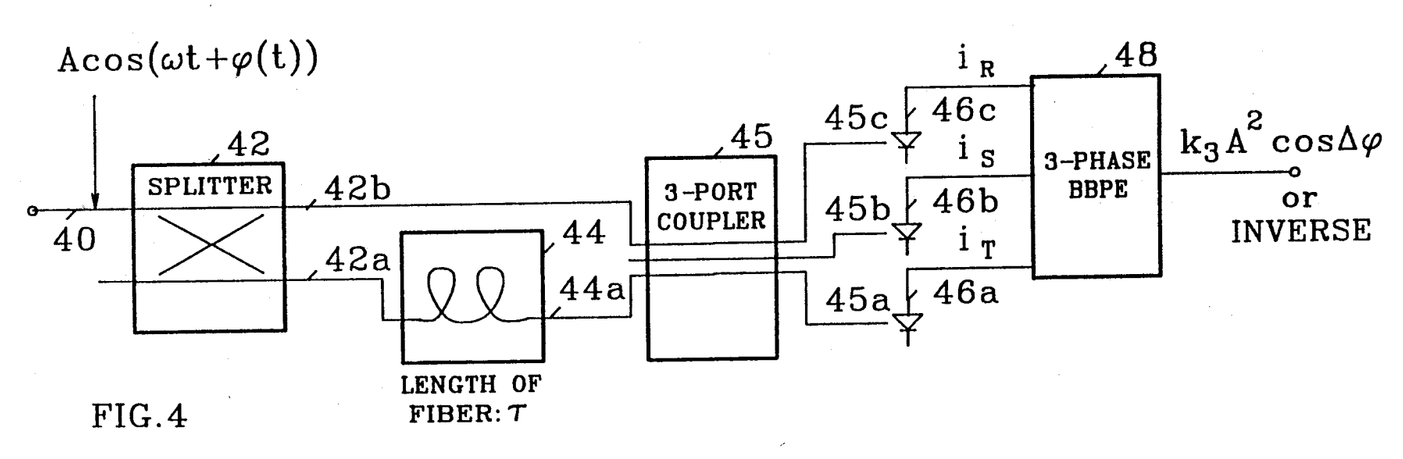
FIG. 4 illustrates a three-phase all-optical direct-detection type demodulator constructed in accordance with the present invention.

The Demodulator of FIG. 4

FIG. 4 illustrates a three-phase direct-detection type demodulator appropriate for lightwave applications.

In the demodulator illustrated in FIG. 4, the initial signal 40 is first fed to a splitter 42 which outputs the split signals on its output lines 42a, 42b.

The split signal on output line 42a is passed through a length of fiber 44 to impose a delay $\tau$, and appears on output line 44a of the delay. The split signal $A \cos(2\pi f_c t + \phi(t))$ on output line 42b is fed to a three-phase coupler 45 with its delayed version on output line 44a $A \cos(2\pi f_c t + \phi(t-) + \alpha)$, where $\alpha = 2\pi f_c \tau$ modulo $2\pi$. The lights from the three coupled outputs fall on the photosensitive detectors 46a-46c which yield currents, having the following signal components $i_R$, $i_S$ and $i_T$:

$$i_R = kA^2 \cos\alpha \cos\Delta\phi$$

$$i_S = kA^2 \cos(\alpha + 120°) \cos\Delta\phi$$

$$i_T = kA^2 \cos(\alpha + 240°) \cos\Delta\phi$$

$$i_T = kA^2 \cos(\alpha + 240°) \cos\Delta\phi$$

where k is a proportionality factor that depends on the coupler losses and diode efficiencies but is independent of A and B.

Figure 6:
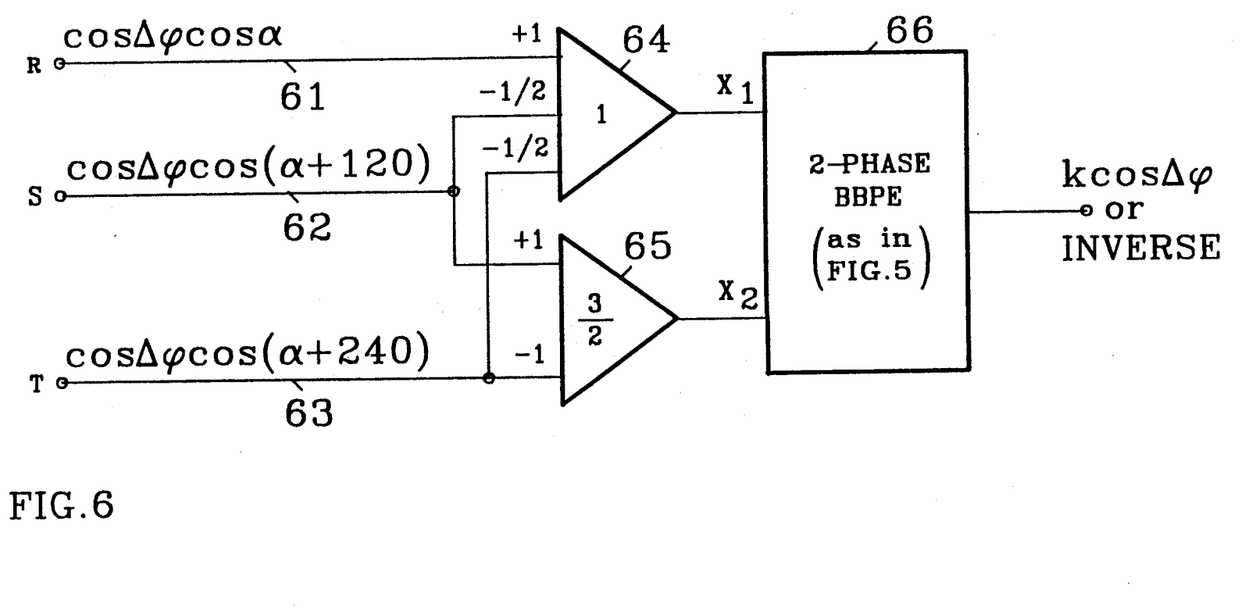
FIG. 6 illustrates a three-phase BBPE also particularly useful in the method and apparatus of the present invention.
Figure 7:
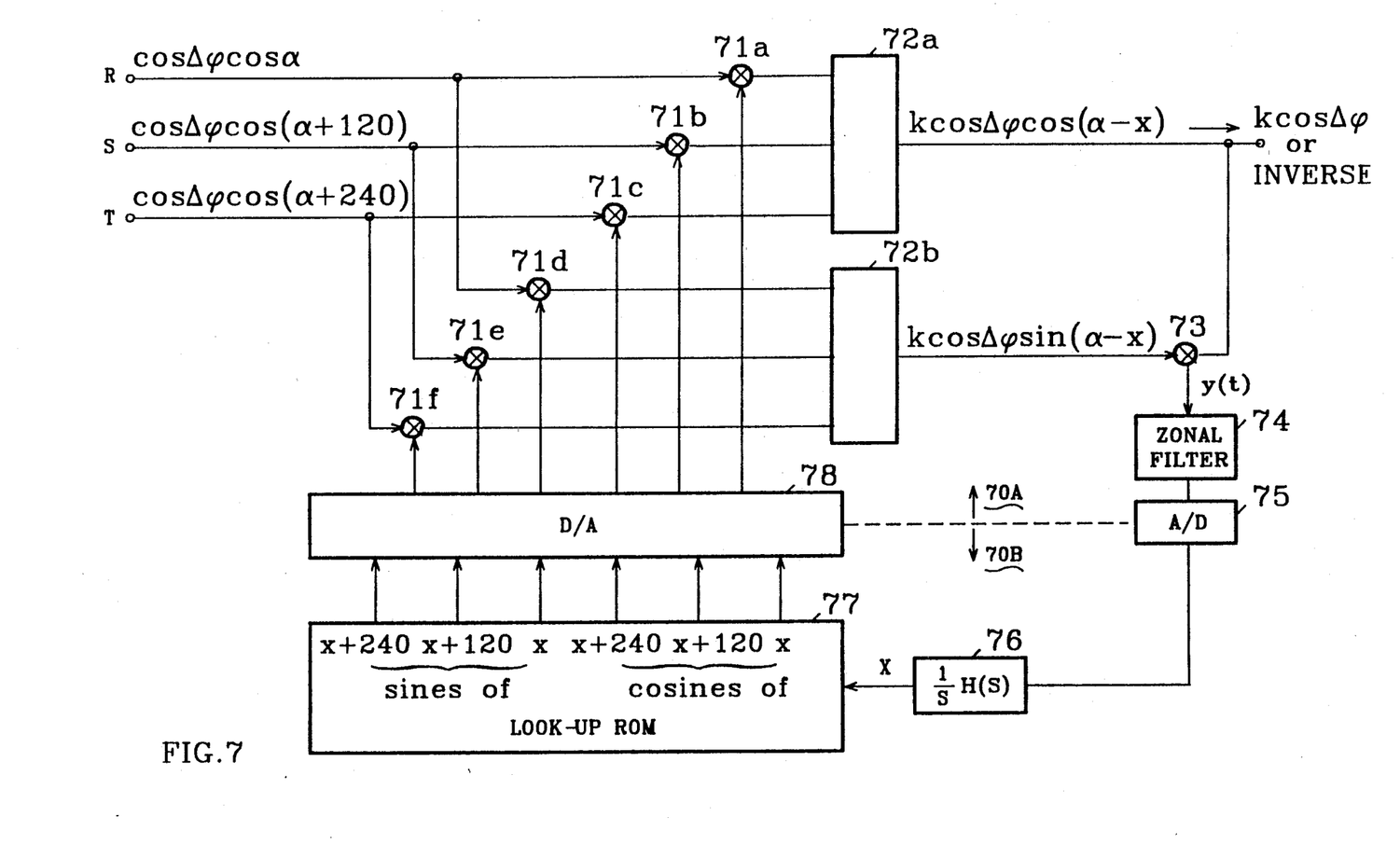
FIGS. 7 and 8 illustrate another three-phase BBPE and two-phase BBPE, respectively, which may be used in the method and apparatus of the present invention.

The outputs from the detectors 46a-46c are combined in a three-phase BBPE 48, e.g., as illustrated in FIGS. 6 and 7. Briefly, the BBPE 48 effectively multiplies $i_R$, $i_S$ and $i_T$ by either $\cos\alpha$, $\cos(\alpha + 120°)$ 48, and $\cos(\alpha + 240°)$, respectively and adds the products, yielding the desired result proportional to $A^2 \cos\Delta\phi$; or, by $\cos(\alpha + \pi)$, $\cos(\alpha + 120° + \pi)$ and $\cos(\alpha + 240° + \pi)$, yielding a result proportional to $-A^2 \cos\Delta\phi$, which is its inverse. The sign ambiguity is resolvable as indicated above in connection with FIG. 3.

The Two-Phase BBPE of FIG. 5

FIG. 5 illustrates a two-phase BBPE such as may be used in any of the above-described demodulators.

The two-phase BBPE of FIG. 5 has two parts: (i) a large bandwith part 50A designed such that it can operate up to gigabits/sec rate, making it suitable for fiber-optic communications by employing microwave mixers and modulators; and (ii) a low rate part 50B which has only to track the slowly varying angle $\alpha$. This can be implemented by digital means, by which the non-linear sinus and cosinus functions are easily achievable.

The large bandwith part 50A comprises four large bandwidth modulators 51a-51d driven by slowly varying base-band cosinus and sinus signals at the BB ports, with the high rate signals $x_1$ (or $i_c$) and $x_2$ (or $i_s$) being input at the modulators' L.O. ports. The adders (Σ) 52a, 52b are broadband amplifiers.

The feedback stage produces the product $$\frac{k^2}{2} \cos^2\Delta\phi \sin 2(\alpha - x)$$

in a broadband mixer 53 where k is a proportionality constant. This product, designated y(t), is a slow waveform, since $\cos^2\Delta\phi$ equals 1, nominally for all "t"s. It is filtered at 54, sampled and converted to digital form by converter 55, and then filtered by a standard phase-lock-loop (PLL) filter H(s) 56, to produce the quantity x. This quantity x is input to the ROM table 57 that supplies the cos x and sin x factors to the high-rate modulators via D/A converter 58. Standard Phase Lock Loop techniques can be used to initiate and ensure proper tracking of the BBPE circuitry. The loop operation ensures conveyance of $2(\alpha-x)$ to zero, or to $2\pi$, such that $\cos(\alpha-x)$ is +1, or −1, respectively. Thus, the output of the BBPE varies with "$\Delta\phi$" or its inverse as indicated in FIG. 5.

The Three-Phase BBPE of FIGS. 6 and 7

The three-phase BBPE has two possible embodiments. The preferred one is illustrated in FIG. 6, and an alternative is illustrated in FIG. 7. In FIG. 6 the three input currents 61, 62, 63 are combined by linear adder amplifiers 64, 65, into two outputs $x_1$, $x_2$, which are processed by the two-phase BBPE 66 described in FIG. 5. In FIG. 7 an augmented version of the two-phase BBPE described in FIG. 5 directly operates on the three inputs. Its operation is similar to that of the two-phase version described in FIG. 5, and corresponding elements carry the same reference numerals but in the "70" series.

Figure 8:
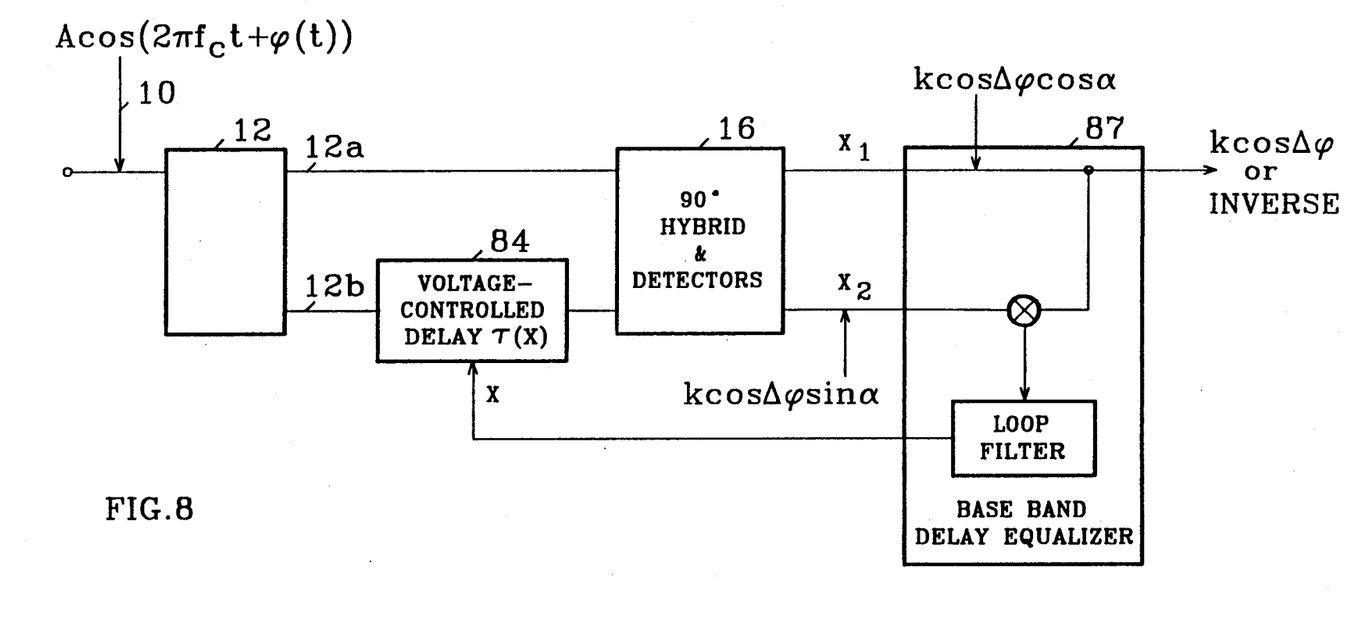

The BBPE of FIG. 8

Rather than equalizing the phase $\alpha=\omega_c\tau$ by first calculating the sine and cosine functions of the quantity x in the BBPE of FIG. 5 and then performing the complex manipulations by 51a–51d to generate the term sin $2(\alpha-x)$, in which the argument $(\alpha-x)$ converges to zero, the phase equalization may be achieved by varying the delay $\tau$ itself using a voltage dependent (or current dependent) delay component that may replace 14 in FIG. 1, or 24 in FIG. 2, or 34 in FIG. 3, or 44 in FIG. 4, with the voltage dependent delay component being controlled by the quantity x which is generated by a baseband delay equalizer (BBDE). Such an embodiment is described in FIG. 8, in the context of a 2-phase direct-detection type apparatus, which resembles, in all its other aspects, FIG. 1, and is therefore correspondingly numbered. However, in the configuration of FIG. 8, the feedback loop will drive the quantity of $\alpha=2\pi f_c\tau$, modulo $2\pi$, to zero due to the operation of the BBDE block 87. Block 84 indicates the voltage-dependent (or current-dependent) delay component controlled by the quantity "x" for achieving the required equalization by varying the delay $\tau$.

While the invention has been described with respect to several preferred embodiments, it will be appreciated that these are set forth merely for purposes of example, and that many other variations, modifications and applications of the invention may be made.

What is claimed is:

1. A method of demodulating a modulated signal having a carrier component and a data component, characterized in that:
    the modulated signal is split into at least two parts one of which is delayed with respect to the other;
    and the two pats are coupled and linearly-combined to produce a combined output corresponding to a function of the data component independent of the carrier component frequency;
    said undelayed part being coupled with the delayed part in a multiport coupler wherein the parts are relatively phase-shifted to produce a plurality of phase-shifted signals;
    said phase-shifted signals being linearly combined such that the data component, in the function of said combined output, is not affected by variations in frequency or phase of the carrier component.

2. The method according to claim 1, wherein said parts are coupled in a 2-port 90°-hybrid to produce two relatively 90°-shifted signals, which signals are linearly combined to produce said combined output.

3. The method according to claim 1, wherein said parts are coupled in a symmetrical 3-port coupler to produce an unshifted signal, a 120°-shifted signal and a 240°-shifted signal, which signals are linearly combined to produce said combined output.

4. The method according to claim 1, wherein said delayed and undelayed parts of said modulated signal are fed to a 2-port 90°-hybrid coupler producing two relatively 90°-shifted output signals, which output signals are linearly combined to produce said combined output.

5. The method according to claim 1, wherein said delayed and undelayed parts of said modulated signal are fed to a 3-port symmetrical coupler producing an unshifted output signal, a 120°-shifted output signal, and a 240°-shifted output signal, which output signals are linearly combined to produce said combined output.

6. The method according to claim 1, wherein said modulated signal is fed with a local oscillator signal to a 2-port 90°-hybrid coupler producing two relatively 90°-shifted intermediate signals; one of said intermediate signals being delayed and then mixed with said intermediate signals to produce two relatively 90°-shifted output signals, said combined output being produced from said relatively 90°-shifted combined output signals.

7. The method according to claim 1, wherein said modulated signal is fed with a local oscillator signal to a 3-port symmetrical coupler producing an unshifted intermediate signal, a 120°-shifted intermediate signal, and a 240°-shifted intermediate signal; said unshifted intermediate signal being delayed and then mixed with each of said other intermediate signals to produce three output signals, relatively ±120° phase shifted; said combined output being produced by linearly combining said output signals.

8. The method according to claim 1, wherein said source signal is a differential phase-shift keying signal wherein the data component changes the phase of the carrier component only when the data component is a data symbol representing a logical "1".

9. The method according to claim 8, wherein said output signals are linearly combined in a baseband phase-equalizer to produce said combined output.

10. The method according to claim 9, wherein said base band phase equalizer linearly combines said signals by a feedback circuit which, upon receiving a 2- or 3-vector: ($A_o \cos \alpha$, $A_o \sin \alpha$) or ($A_o \cos \alpha$, $A_o\cos$ ($\alpha+120°$), $A_o \cos(\alpha+240°)$), respectively, estimates a quantity x close to $\alpha$; generates a 2- or 3-vector (cos x, sin x) or (cos x, cos (x+120°), cos (x+240°)), respectively, and then performs their inner product, generating terms proportional to $A_o \cos(\alpha-x)$ and to $A_o \sin(\alpha-x)$, the first term being proportional to the desired quantity, $A_o$, while the second term is close to the error term $A_o\delta=A_o(\alpha-x)$ used in the feedback configuration to generate the quantity x.

11. The method according to claim 8, wherein a base-band delay equalizer operating on said output signals, generates the quantity x which varies the delay L in a feedback loop driving the quantity $\alpha=2\pi f_c\tau$, modulo $2\pi$, to zero, and thereby driving one of the said output signals to the desired output value corresponding to a function of the data component independent of the carrier component frequency.

12. Apparatus for demodulating a modulated signal having a carrier component and a data component, comprising:
    splitting means for splitting the modulated signal into at least two parts one of which is delayed with respect to the other;
    and combining means for coupling the two parts and for linearly-combining them to produce a combined output corresponding to a function of the data component independent of the carrier component frequency; said combining means including p1 means for coupling the undelayed part with the delayed part such that the parts are relatively phase-shifted to produce a plurality of phase-shifted signals;
    and means for linearly combining the phase-shifted signals such that the data component, in the function of said combined output, is not affected by variations in frequency or phase of the carrier component.

13. The method according to claim 12, wherein said combining means includes a 2-port 90°-hybrid to produce two relatively 90°-shifted signals, which signals are linearly combined to produce said combined output.

14. The apparatus according to claim 12, wherein said combining means includes a symmetrical 3-port coupler to produce an unshifted signal, a 120°-shifted signal and a 240°-shifted signal, which signals are linearly combined to produce said combined output.

15. The apparatus according to claim 12, wherein the apparatus is a direct-detection type demodulator.

16. The apparatus according to claim 12, wherein the apparatus is a heterodyne type demodulator wherein the original modulated signal is fed with a local oscillator signal to said combining means.

17. The apparatus according to claim 12, wherein said modulated signal is differential phase-shift keying signal wherein the data component changes the phase of the carrier component only when the data component is a data symbol representing a logical "1".

18. The apparatus according to claim 15, further including a base-band phase-equalizer for linearly combining said output signals to produce said combined output.

19. The apparatus according to claim 16, wherein said base band phase equalizer linearly combines said signals by a feedback circuit which, upon receiving a 2- or 3-vector: ($A_o \cos\alpha$, $A_o \sin\alpha$) or ($A_o \cos\alpha$, $A_o\cos(\alpha+120°)$, $A_o \cos(\alpha+240°)$), respectively, estimates a quantity x close to $\alpha$; generates a 2- or 3-vector (cos x, sin x) or (cos x, cos (x+120°), cos (x+240°)), respectively, and then performs their inner product, generating terms proportional to $A_o \cos(\alpha-x)$ and to $A_o \sin(\alpha-x)$, the first term being proportional to the desired quantity, $A_o$, while the second term is close to the error term $A_o\delta=A_o(\alpha-x)$ used in the feedback configuration to generate the quantity x.

20. The apparatus according to claim 15, further including a baseband delay equalizer operating on said output signals to generate the quantity x which varies the delay $\tau$ in a feedback loop driving the quantity $\alpha=2\pi f_c\tau$, modulo $2\pi$, to zero, and thereby driving one of the said output signals to the desired output value corresponding to a function of the data component independent of the carrier component frequency.

* * * * *